(12) United States Patent
Maiorana

(10) Patent No.: US 8,042,875 B2
(45) Date of Patent: Oct. 25, 2011

(54) CENTER DOOR ASSEMBLY FOR DUMP BED AND METHOD OF REMOVING RETRACTABLE DOOR THEREIN

(75) Inventor: James A. Maiorana, Hartville, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 448 days.

(21) Appl. No.: 12/335,114

(22) Filed: Dec. 15, 2008

(65) Prior Publication Data

US 2010/0148565 A1    Jun. 17, 2010

(51) Int. Cl.
*B60P 1/26* (2006.01)
(52) U.S. Cl. .............................. 298/7; 298/23 D; 49/466
(58) Field of Classification Search ............ 298/7, 17 R, 298/23 R, 23 MD, 23 D, 23 DF, 28; 105/282.1, 105/282.2, 299; 277/642, 647; 296/202, 296/52, 146.9; 49/454, 456, 464–466, 489.1, 49/490.1

See application file for complete search history.

(56) References Cited

U.S. PATENT DOCUMENTS

| | | | | |
|---|---|---|---|---|
| 882,868 | A | * | 3/1908 | Campbell .......................... 298/7 |
| 1,948,170 | A | * | 2/1934 | Forde ........................... 298/23 R |

\* cited by examiner

*Primary Examiner* — Stephen Gordon
(74) *Attorney, Agent, or Firm* — Sand & Sebolt

(57) ABSTRACT

A center door assembly for a dump bed and a method for removing the door from the dump bed. A frame is mounted in a wall of the dump bed and has a pair of opposite and spaced apart channels. A pair of elastomeric inserts are removably mounted in the channels. A retractable door has a pair of edges slidably received in the inserts and is movable linearly within the channels between a closed position and an open position. A pivot linkage assembly is operatively connected to the door for linearly moving the door between the closed and open positions. The elastomeric inserts are removed from the channels through a bottom opening in the channels providing lateral space between the channels to enable the door to be removed from the frame. The elastomeric inserts are provided with bend areas enabling them to be compressed for removal from the channels.

10 Claims, 20 Drawing Sheets

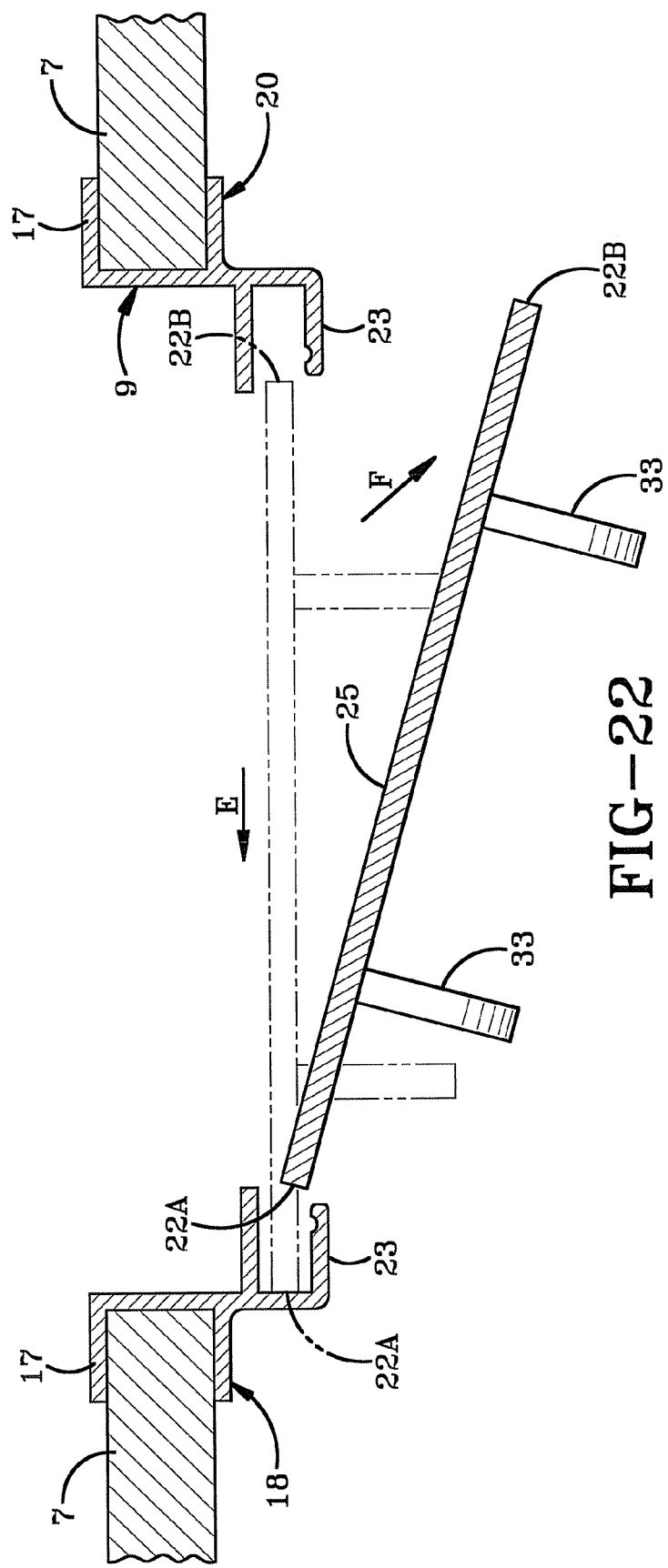

CENTER DOOR ASSEMBLY FOR DUMP BED AND METHOD OF REMOVING RETRACTABLE DOOR THEREIN

BACKGROUND OF THE INVENTION

1. Technical Field

The present invention relates to dump bodies on trucks. More particularly the present invention relates to dump bodies which are pivotally mounted such that the front may be elevated and the contents removed by gravity through a chute located in a rear tailgate. Specifically, the present invention relates to an improvement in coal chutes which enhances the longevity and operability by means of an easily replaceable coal chute door within an elastomeric track.

2. Background Information

Many trucks have a bed or body that is lifted upwardly relative to the vehicle to unload materials by gravity from within the bed. Dump bodies for industrial use, such as dump trucks and coal trucks, typically employ a tailgate which is pivotally mounted to the top of the side walls of the dump body and extends across the width of the bed, such that it may swing between an open and closed position as the front of the dump body varies in elevation.

These rear tailgates oftentimes include a center door assembly called a "coal chute". The coal chute is substantially narrower than the rear tailgate and includes a door that can be selectively opened or closed. Common coal chute designs involve sliding the door up and down within tracks mounted in the sidewalls of the chute. Using a pivot arm, the user draws the door upwards along the chute door track before the bed of the dump truck is lifted. As the bed is lifted, the material within the bed exits through the coal chute in a contained and controlled stream that can be fed directly onto a ditch, intake basin, or onto a conveyor belt.

Due to the enormous tonnage carried by such trucks and the abuse to the walls of such truck bodies, the retaining chute door and the door track is subjected to distorting forces and are oftentimes broken or dented by movement of the material within the dump body or through the chute itself. When the cute door or track becomes distorted, the chute's effectiveness is diminished as the door cannot form a proper seal or slide within the track. Therefore gravel, coal, sand or other particulate matter can escape through the resulting gap. Consequently, it is not uncommon for the chute door to become unusable and require replacement or repair.

Replacing or repairing parts of the chute is very time consuming and expensive. Typical chutes have welded tracks, pivot arms, plates, and various other components. The chute assembly itself is welded onto the tailgate and difficult to remove. Furthermore, when the chute door or track is repaired or replaced, these items must be re-welded to the tailgate body, adding more time and expense to the process of replacing or repairing a part of the chute.

Therefore, the need exists for a center door assembly for a dump bed which includes easily replaceable and repairable parts, which parts are not welded to the tailgate so disassembly and reassembly time and expense will be minimized.

BRIEF SUMMARY OF THE INVENTION

One object of the invention is to provide an easily replaceable door on a center door assembly for a dump bed.

A further object of the invention is to provide a chute assembly which employs elastomeric material for the tracks which slidably receive the edges of the chute door therein to provide a removable insert to receive the edges of the chute door and facilitate removal of the chute door from within the tracks for repair or replacement.

It is the object of the invention to provide a tailgate having a center door assembly which remains in alignment without degradation of the seal therebetween.

Another object of the invention is to provide a tailgate and center door assembly which is positively secured to prevent inadvertent gate openings. These features are obtained by the center door assembly for a dump bed of the present invention, the general nature of which includes a center door assembly for a dump bed comprising: a frame adapted to be mounted in a wall of a dump bed; a pair of opposite and spaced apart channels defined by said frame; at least one insert removably mounted in one of said channels; a retractable door having a pair of edges slidably received in the at least one insert; and movable linearly between a closed position and an open position; an axle rotatably mounted with respect to the frame; a pivot linkage having a spaced apart first and second end, wherein the first end is secured to the axle and the second end is secured to the door; and a handle for rotating the axle whereupon rotation of the axle slidably moves the door between the closed position and the open position through the pivot linkage; and wherein said insert when removed from the channel enables the door to be removed from the frame.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 22 is an enlarged sectional view taken along line 22-22.

Similar numbers refer to similar parts throughout the drawings.

DETAILED DESCRIPTION OF THE INVENTION

Figure 1:
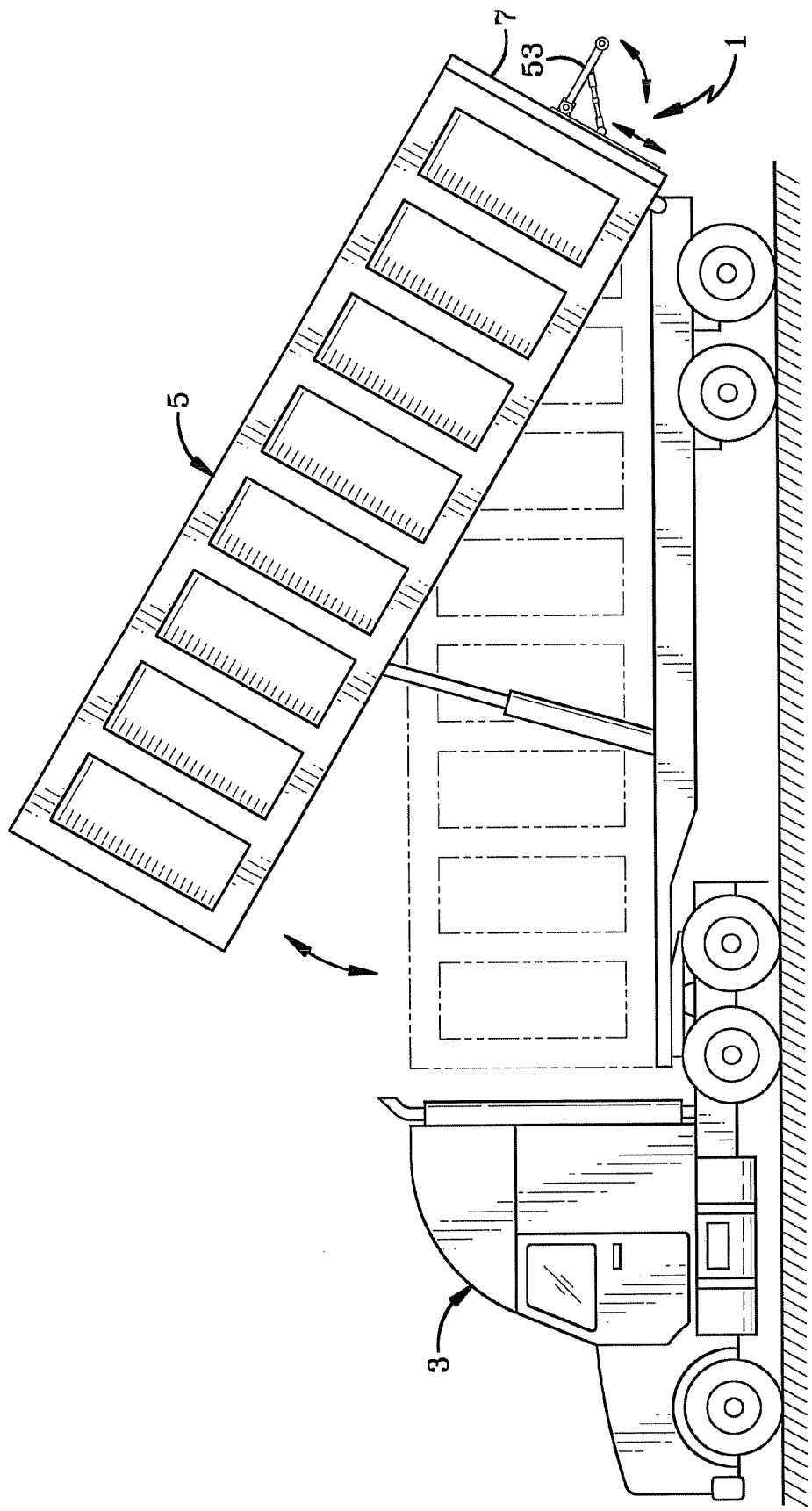
FIG. 1 is a side elevational view of a dump truck and dump body shown in the raised position.
Figure 2:
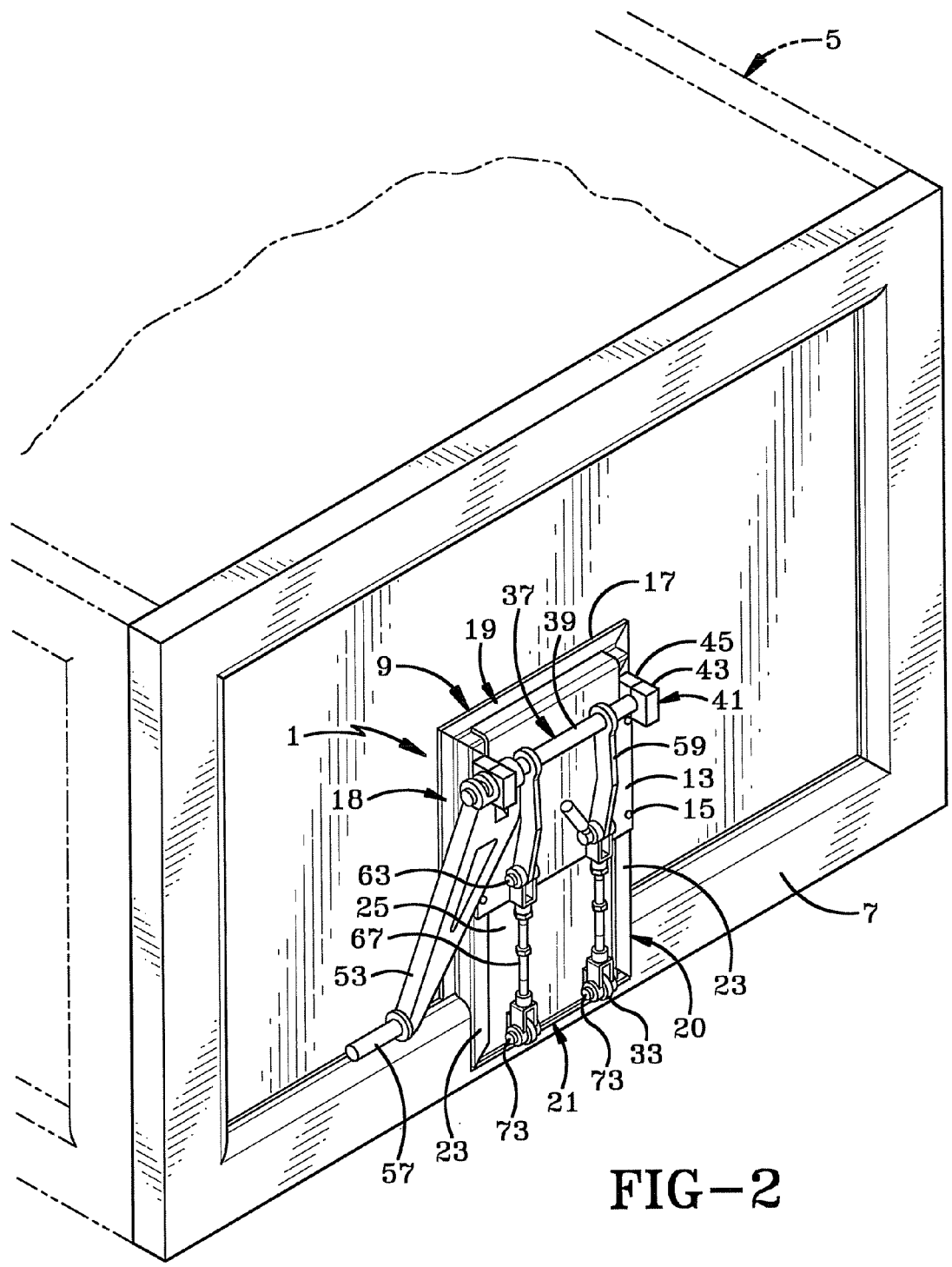
FIG. 2 is a perspective view of the center door assembly of the present invention mounted on a tailgate of a dump body and shown in the closed position.

The center door assembly of the present invention is generally indicated at 1, and is shown in FIGS. 1-22. Center door assembly 1 is typically disposed in a rear tailgate wall 7 of a dump bed 5 of a vehicle 3 as shown in FIGS. 1 and 2.

Figure 3:
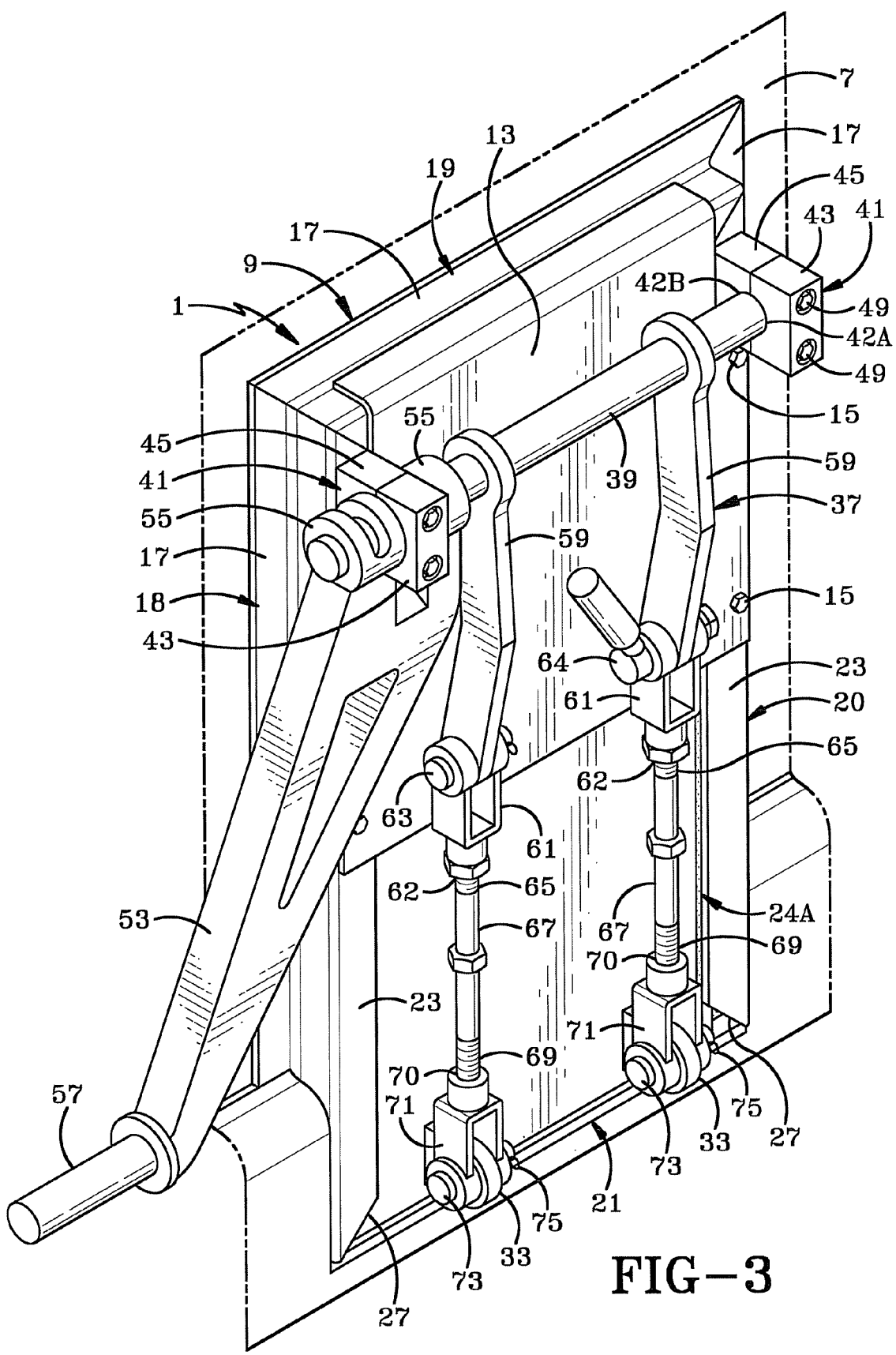
FIG. 3 is an enlarged perspective view of the center door assembly with parts cut away.
Figure 4:
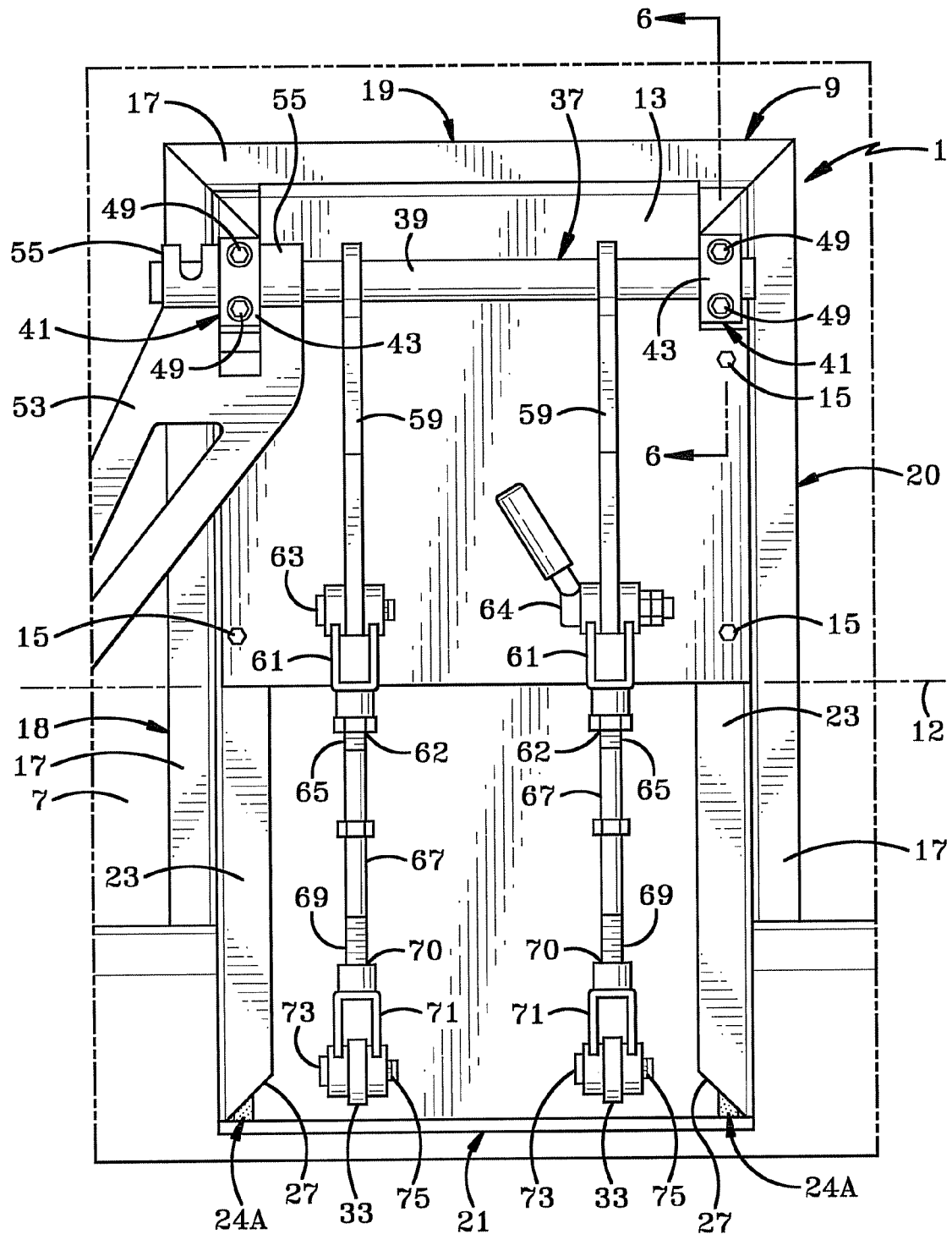
FIG. 4 is front elevational view of the center door assembly in the closed position.
Figure 5:
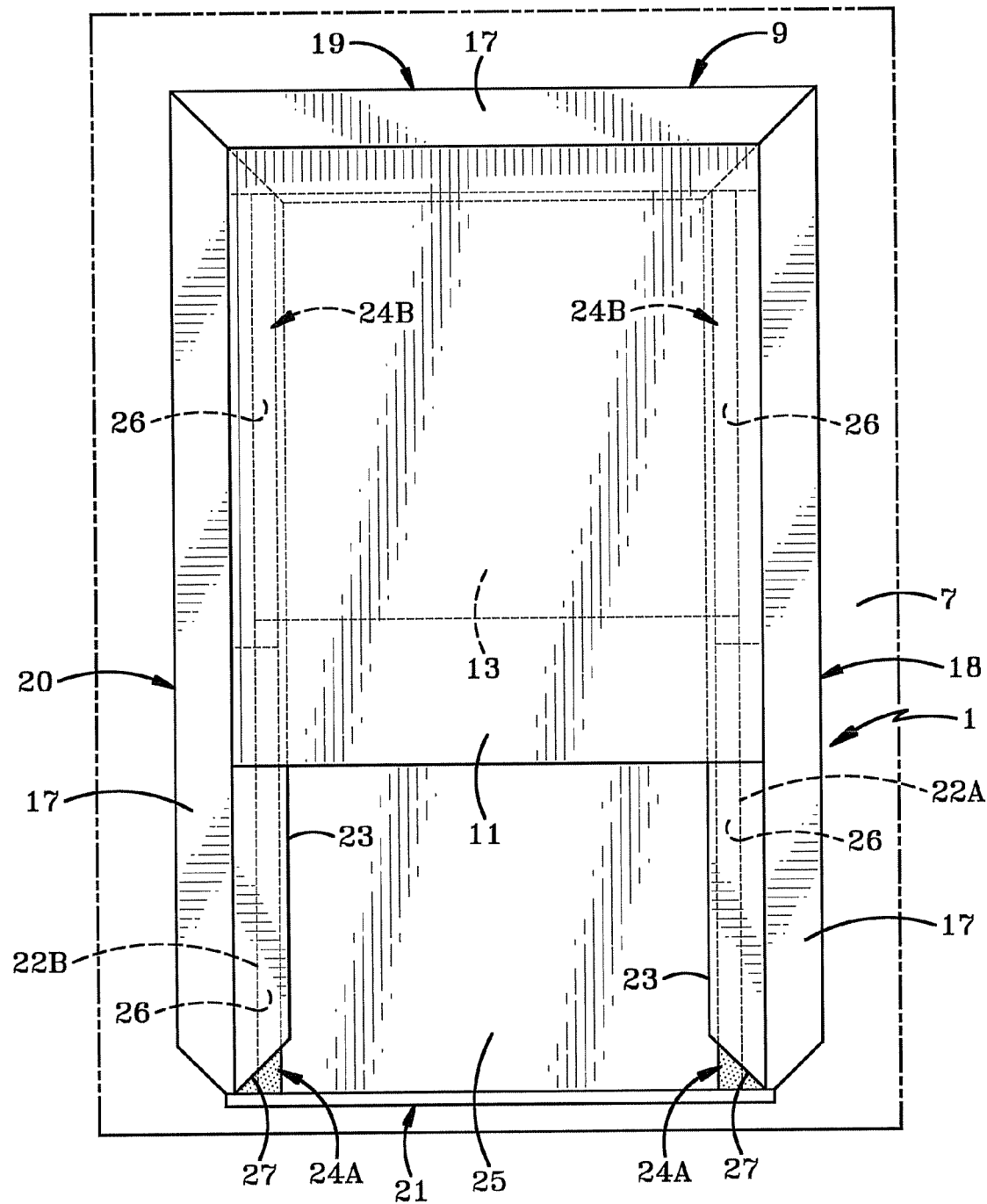
FIG. 5 is a rear elevational view of the center door assembly in the closed position.

Referring to FIGS. 3, 4, 5, and 6, door assembly 1 includes a rectangular frame 9 having top and bottom ends 19 and 21 respectively, first and second sides 18 and 20 respectively, an inner cover plate 11 secured to frame 9 by a weld 14 (FIG. 6), and an outer cover plate 13 externally secured to frame 9 with a plurality of bolts 15 or other type of fasteners. Outer cover plate 13 extends in a spaced parallel relationship with respect to inner cover plate 11. Outer cover plate 13 extends from top end 19 of frame 9 to the general longitudinal midpoint of frame 9, indicated by dot dash line 12 in FIG. 4. As shown in FIG. 5, inner cover plate 11 is generally longer and extends past line 12. Frame 9 includes a U-shaped channel 17 extending around the periphery of frame 9, and is shaped to receive tailgate wall 7 for securing center door assembly 1 to dump bed 5.

Figure 10:
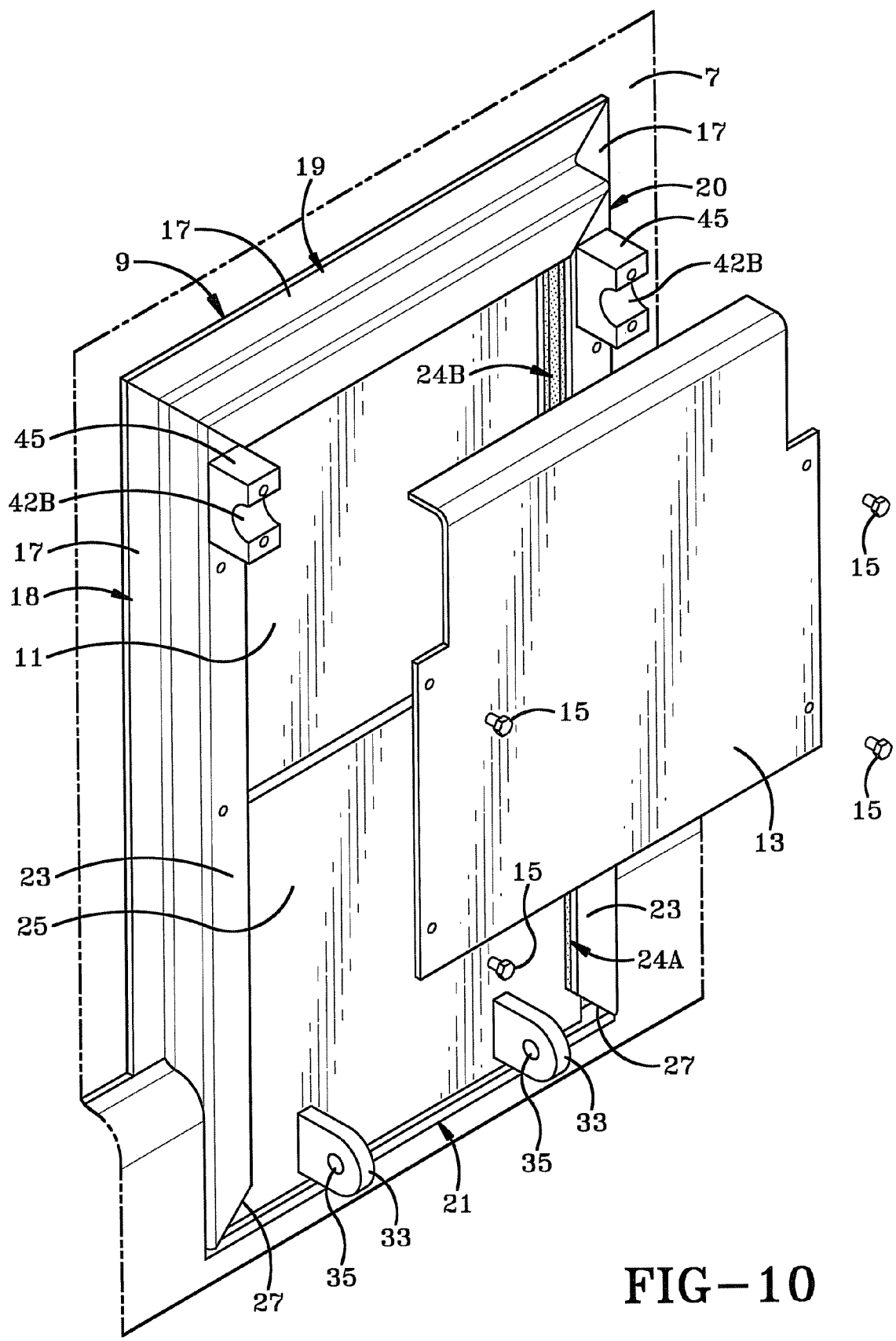
FIG. 10 is an exploded perspective view of the center door assembly with the linkage assembly removed.
Figure 11:
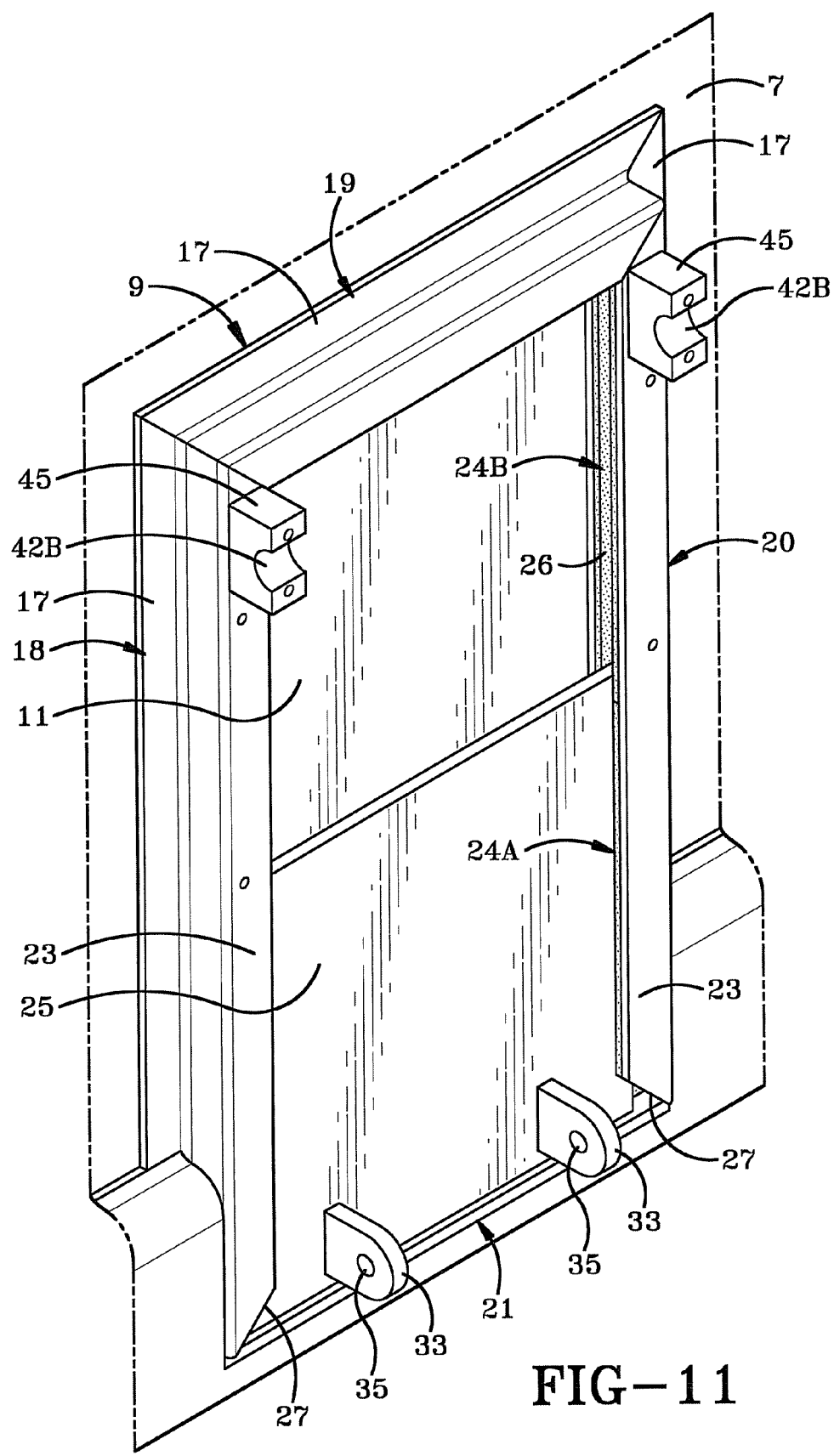
FIG. 11 is a perspective view of the center door assembly with the outer cover plate and the door linkage assembly removed.
Figure 12:
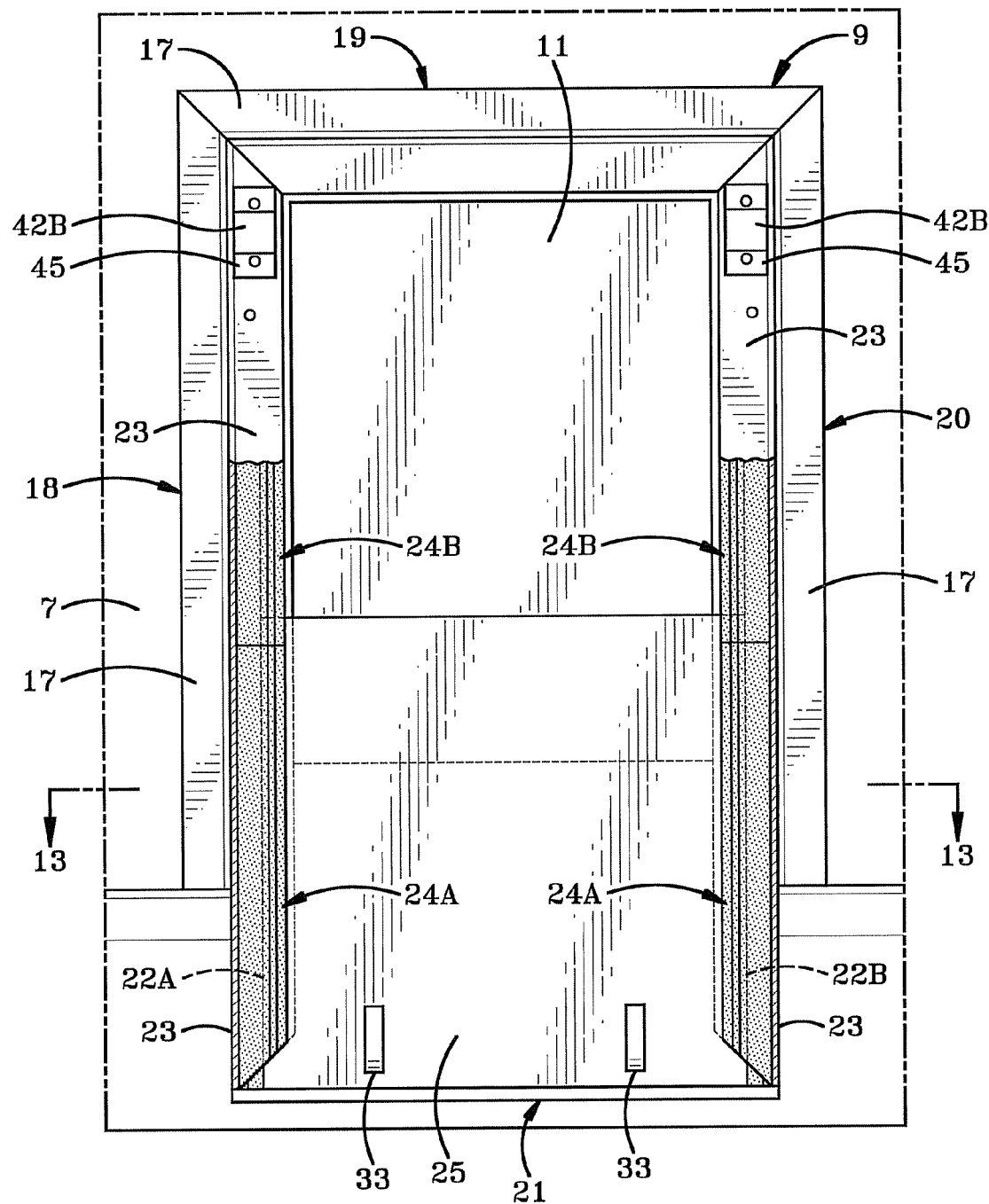
FIG. 12 is a front elevational view of the center door assembly as shown in FIG. 11 with portions broken away to show the elastomeric tracks.

Frame 9 further includes a pair of U-shaped channels 23 (FIGS. 14, 16, 17, and 18) extending longitudinally along each side 18 and 20 of frame 9, each terminating in a notch 27 proximate bottom end 21 of frame 9. Each channel 23 slidably receives a pair of elastomeric inserts 24 conforming to the shape of channels 23 (FIGS. 6, 13-16). Inserts 24 are sized to slidably receive side edges 22 of a chute closure door 25 therein. Door 25 has a generally flat planer plate shape and is sized to extend between each side 18 and 20 within inserts 24 and extending approximately one-half the longitudinal length of frame 9. Door 25 is slidably movable between cover plates 11 and 13 between an open position as shown in FIG. 15 and a closed position as shown in FIG. 12. A pair of lobes 33 are attached to and extend from adjacent a bottom edge of door 25 as shown in FIGS. 10 and 11. Each lobe 33 is formed with a hole 35, the purpose of which is described below.

Figure 13:
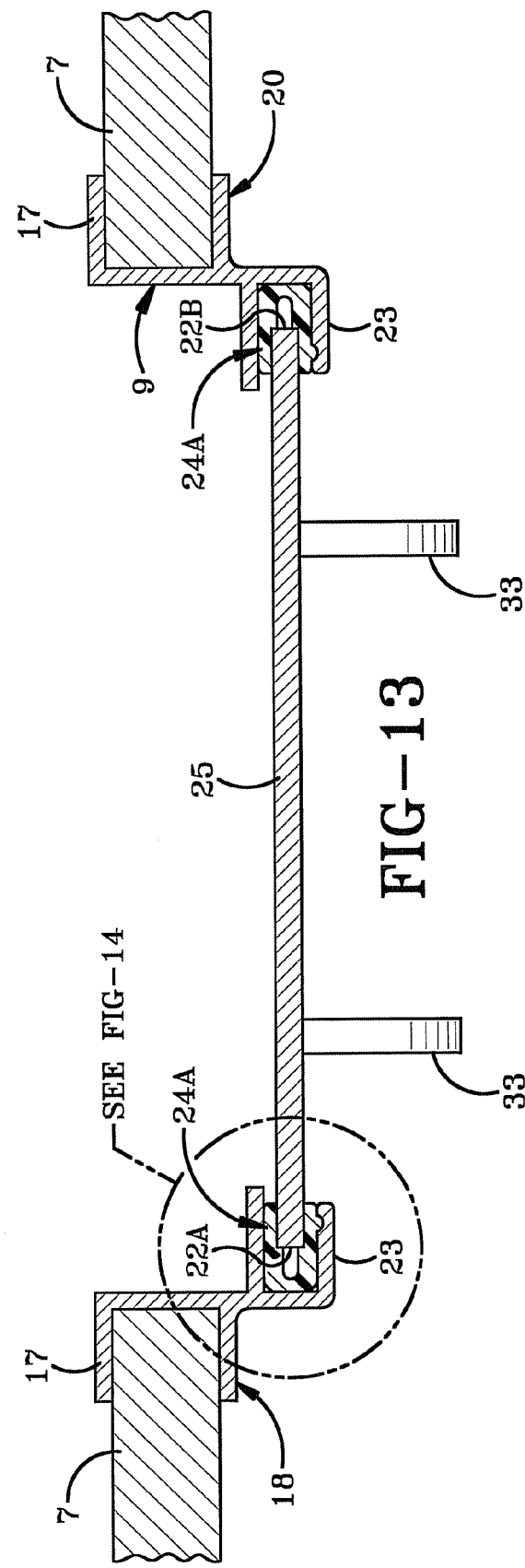
FIG. 13 is an enlarged sectional view taken on line 13-13 of FIG. 12.
Figure 14:
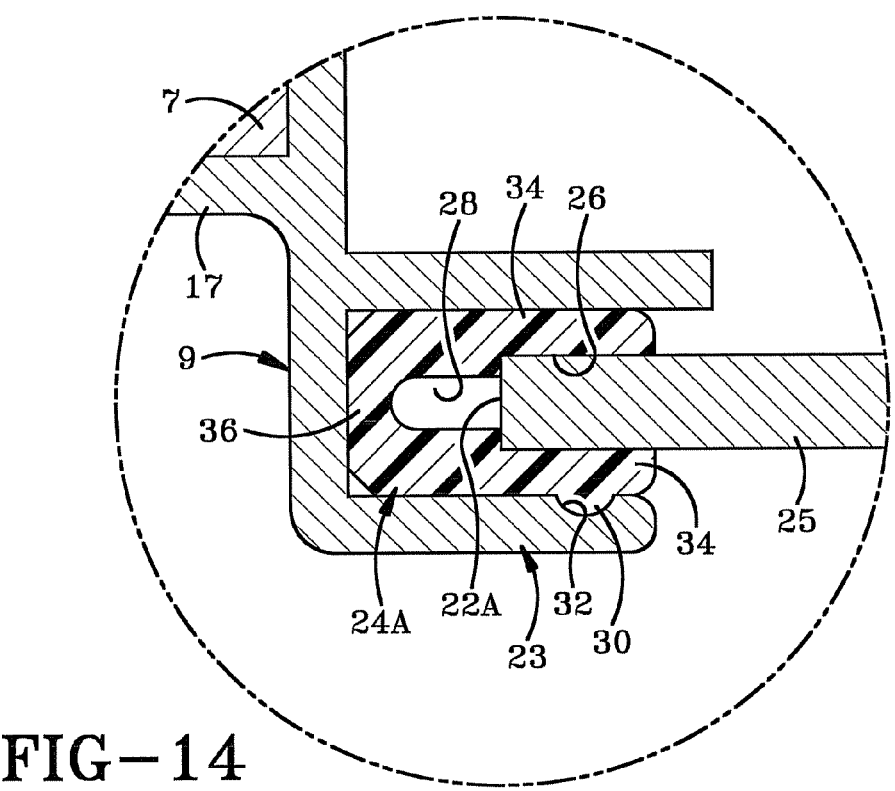
FIG. 14 is an enlarged sectional view of the encircled portion of FIG. 13.
Figure 16:
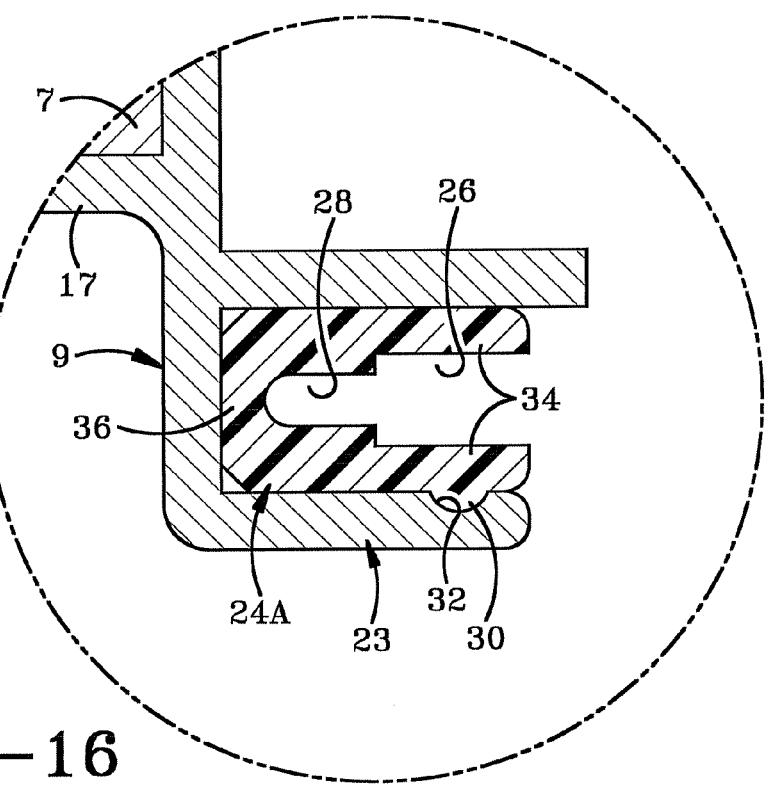
FIG. 16 is an enlarged sectional view taken on line 16-16 of FIG. 15.
Figure 15:
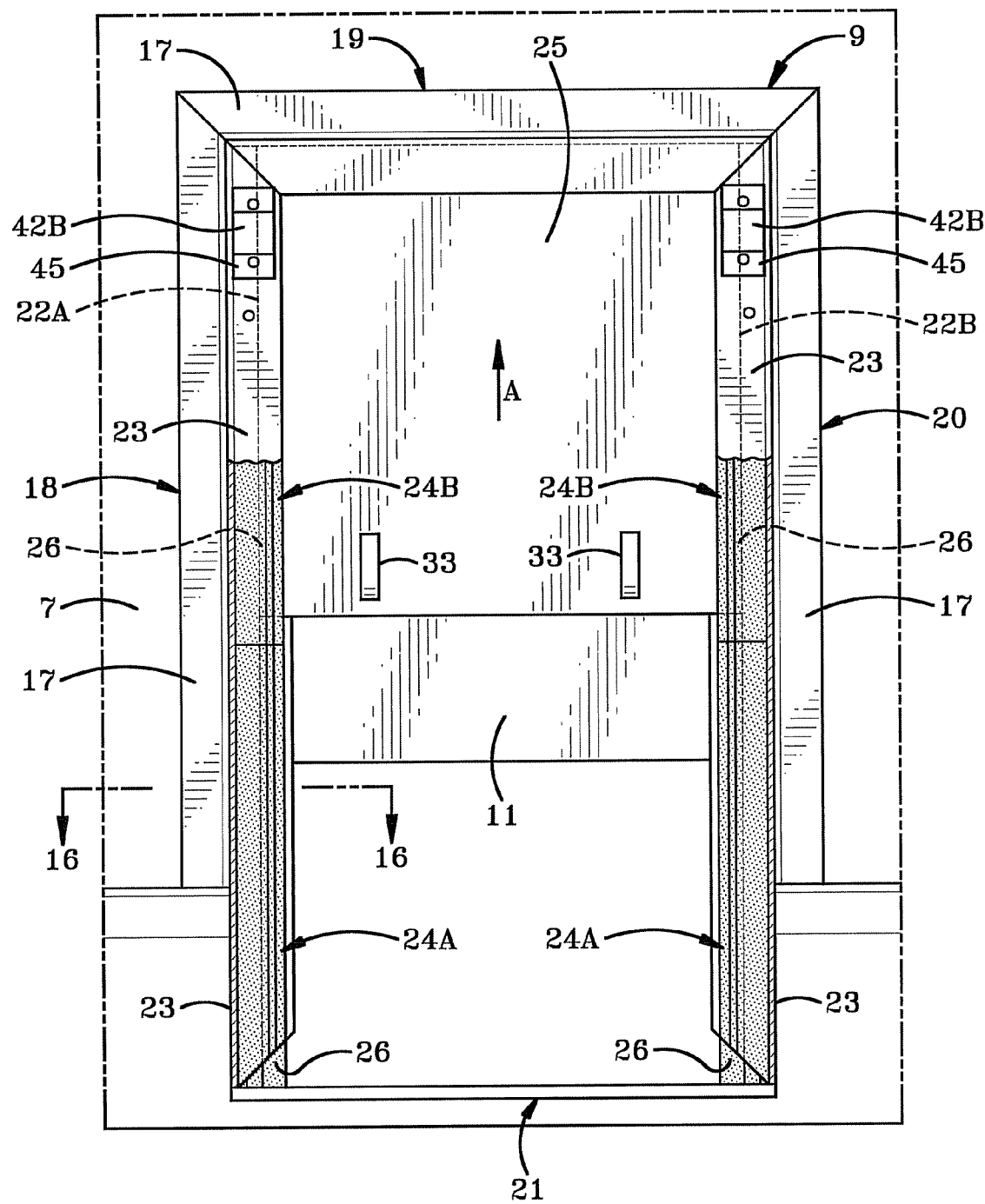
FIG. 15 is a front elevational view similar to FIG. 12 of the center door assembly with parts cut away and with the door in the raised open position.

Referring to FIGS. 13, 14, and 16, elastomeric inserts 24 have a general U-shaped cross-sectional configuration having a pair of spaced legs 34 extending from an end wall 36. Each insert 24 includes a door receiving recess 26, a bend recess 28 formed in end wall 36, and a D-shaped protruding nub 30 sized to fit into a corresponding D-shaped recess 32 formed in one of the legs of U-shaped channel 17 of frame 9.

Figure 6:
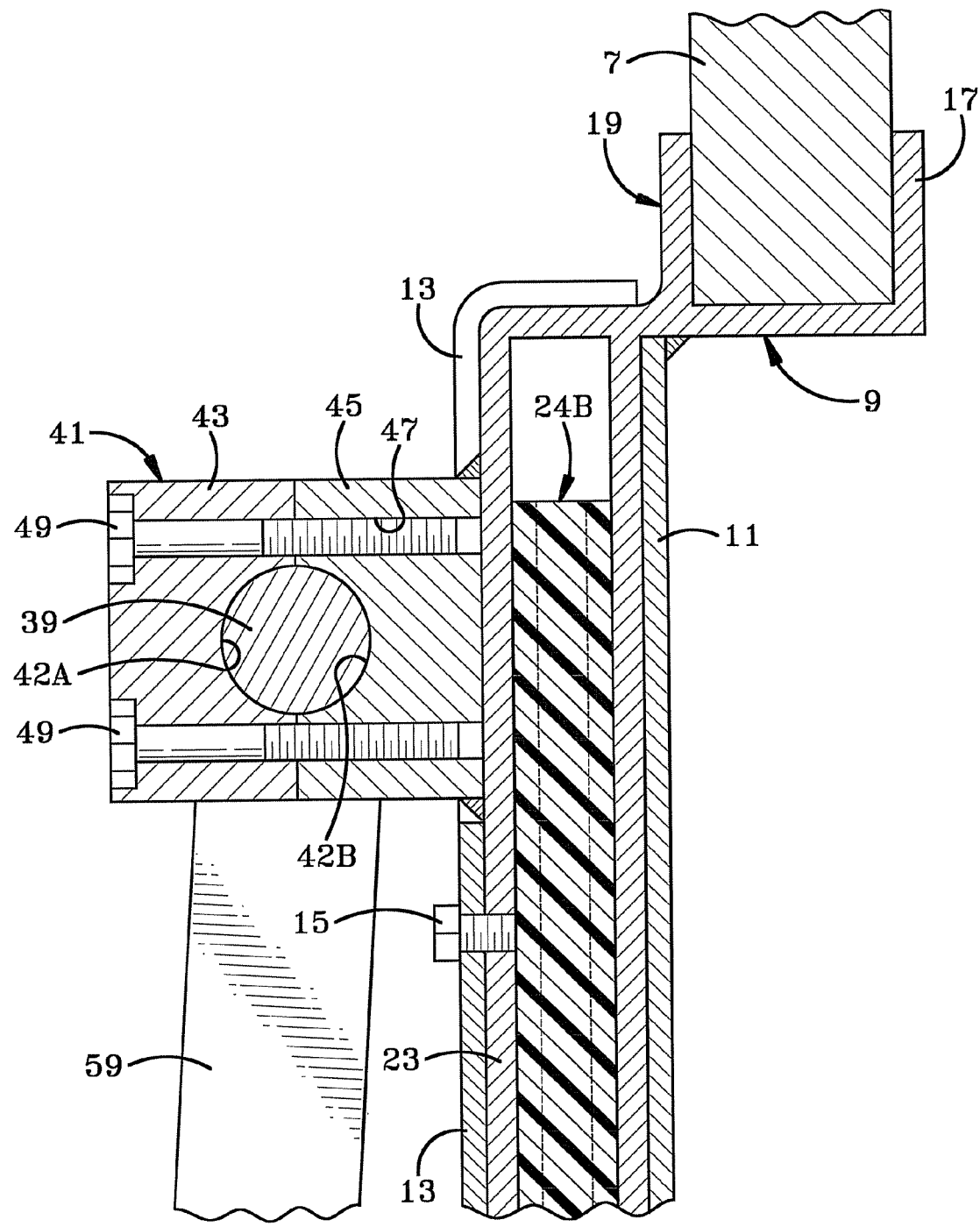
FIG. 6 is an enlarged sectional view taken on line 6-6 of FIG. 4.
Figure 7:
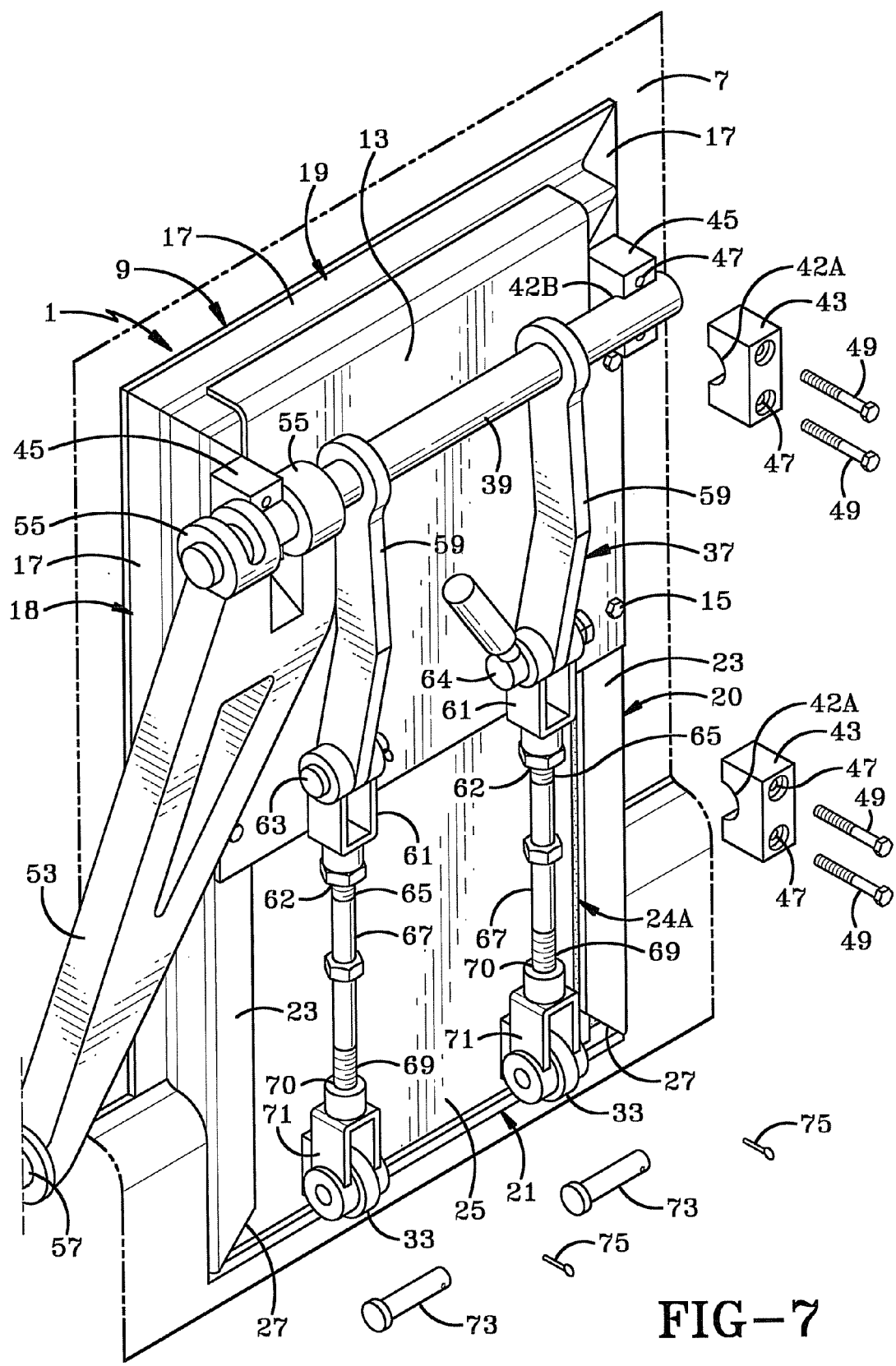
FIG. 7 is an exploded perspective view of the center door assembly as shown in FIG. 2.
Figure 9:
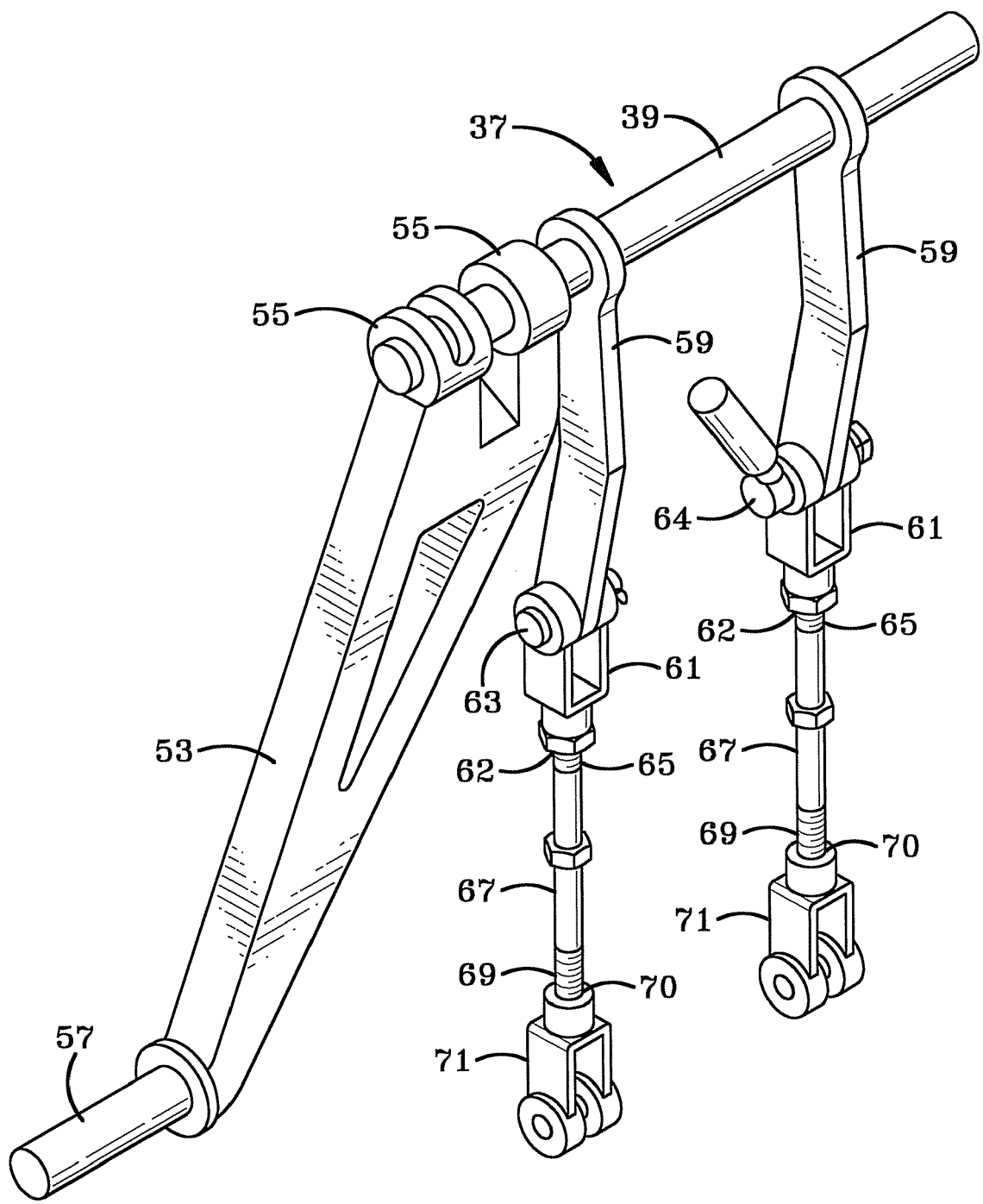
FIG. 9 is a perspective view of the door linkage assembly.

Referring to FIGS. 3, 4, and 6, and shown particularly in FIGS. 7 and 9, a pivot linkage assembly indicated generally at 37 is removably secured to frame 9. Pivot linkage 37 includes an axle 39 secured at each end by a pillow block bearing 41. Each block bearing 41 extends outwardly from frame 9 and is comprised of a first and second blocks 43 and 45 each having a half-moon recess 42. First block 43 is welded to frame 9 proximate top end 19 and includes a pair of threaded receiving holes 47. Second block 45 is removably secured to first block 43 by means of a pair of threaded bolts 49 extending through holes 51 formed in second block 45 and into threaded receiving holes 47. Pivot linkage 37 is further comprised of a crank arm 53 having annular mounting bosses 55 secured to axle 39 by welding or other attachment means. Crank arm 53 extends from axles 39 and terminates in a crank handle 57 sized to be manipulated by a user's hand.

A pair of lift arms 59 extend from and are welded to axle 39 intermediate pillow block bearings 41. Each lift arm 59 is pivotally connected to a U-shaped bracket 61 by a bolt 63, each bracket 61 forming a bottom threaded hole 62 for receiving a first end 65 of a threaded stud bolt 67 therein. Bolt 67 extends to second threaded end 69 which is received in a threaded receiving hole 70 of a second U-shaped bracket 71. Each bracket 71 is pivotally attached to lobe 33 by a removable bolt 73 secured by a cotter pin 75. A securing handle 64 extends from one bolt 63.

Figure 21:
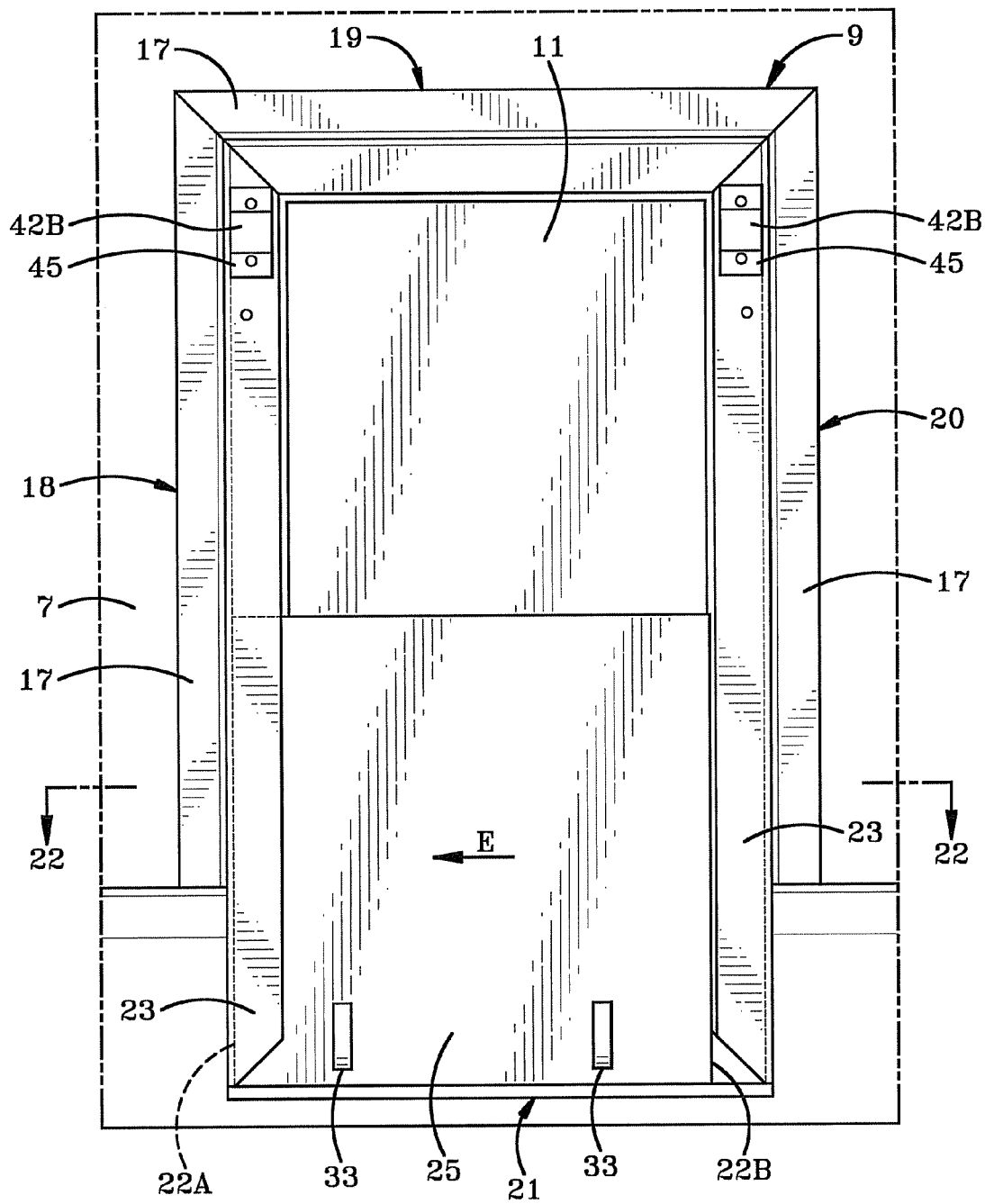
FIG. 21 is a view similar to FIG. 20 after removal of the door and with the door being moved laterally within the supporting tracks.

In operation, as shown in FIG. 1, center door assembly 1 is located in tailgate wall 7 of dump bed 5 on truck 3 with chute closure door 25 in the closed position (FIG. 21). A material 2 (not shown) such as stones, sand, mulch, or any other matter which is typically transported by truck within a dump bed, is loaded into dump bed 5. Truck 3 moves material 2 to the desired material deposit location and positions tailgate wall 7 to release material 2 in the desired location. The user slidably moves chute closure door 25 from a closed position to an open position (FIG. 15) and locks door 25 in the open position by turning handle 64 (FIG. 4). Dump bed 5 then is extended from a generally horizontal position to an angled position with the ground which allows the gravitational force to pull material 2 towards tailgate wall 7 within dump bed 5. Material 2 is dumped out of dump bed 5 through the opening defined by frame 9 and the open position of coal chute door 25 in tailgate wall 7. After the desired amount of material 2 is dumped, dump bed 5 is returned to the horizontal position. Handle 64 is loosened to unlock coal chute door 25. The user then moves coal chute door 25 from an open position to a closed position by pivotal movement of crank arm 53 in preparation for loading dump bed 5 with material 2.

Pivot linkage assembly 37 allows the user to slidably move coal chute door 25 between open and closed positions. As shown in FIGS. 3 and 4, axle 39 extends between pillow block bearings 41 which allow axle 39 to rotate within half moon recess 42 of each bearing 41. Crank arm 53 is secured to one end of axle 39 and rotates axle 39 when crank handle 57 is moved by a user. The rotation of axle 39 rotates lift arms 59 which are secured to axle 39 at one end. At the opposite end, lift arms 59 are engaged with first U-shaped bracket 61 which rotates about bolt 63. First U-shaped bracket 61 extends to receive threaded stud bolt 67 which extends to be received by second U-shaped bracket 71. Second U-shaped bracket 71 is pivotally engaged with lobe 33 about a removable bolt 73.

To move chute closure door 25 from a closed to an open position, the user rotates crank arm 53 causing axle 39 to rotate. Axle 39 raises lift arms 59 which pivot about bolt 63, pulling first U-shaped bracket 61, stud bolt 67 and second U-shaped bracket 71 in an upward direction. The movement of these elements within pivot linkage assembly 37 results in an upward force on lobes 33 which transfers the force to chute closure door 25, drawing door 25 upwards.

Each sidewall 22 of chute closure door 25 is slidably received by door receiving recesses 26 formed in inserts 24. Inserts 24 fit in U-shaped channel 23 formed in frame 9. One desired property of the material comprising inserts 24 is to reduce the difficulty of sliding chute closure door 25 by providing a low friction coefficient between door 25 and inserts 24. To this end, inserts 24 are typically made from Teflon® or other similar low friction material. As upward force is applied to door 25 and sidewalls 22 thereof, door 25 slides within receiving recesses 26 formed in inserts 24. The sliding movement is guided by the general shape of U-shaped channels 23 and recesses 26, and is generally co-planer with tailgate wall 7. When door 25 is in the open position, the hole through tailgate wall 7 is exposed and material may exit dump bed 5. When door 25 is in the closed position, the hold through tailgate wall 7 is sealed and material will not exit dump bed 5.

As material 2 is loaded and unloaded, stress is applied to the elements comprising door assembly 1. Chute door 25 including sidewalls 22 thereof may become damaged or dented, hindering the sliding movement of door 25 within door receiving recess 26. A distortion of the general planar shape of door 25 typically renders door 25 unable to open or close as recesses 26 closely conform to the shape of sidewalls 22 to slidable hold door 25 within frame 9. If door 25 becomes damaged, it must be replaced. However, door 25 is typically very difficult to replace. Parts within a typical center door assembly are welded and fixedly attached to one another, making removal of the center door very difficult. Center door assembly 1 provides for a method to easily replace elements within assembly 1. The elements comprising center door assembly 1 are held in position by easily removable parts allowing a user to disassemble and reassemble center door assembly 1.

Figure 8:
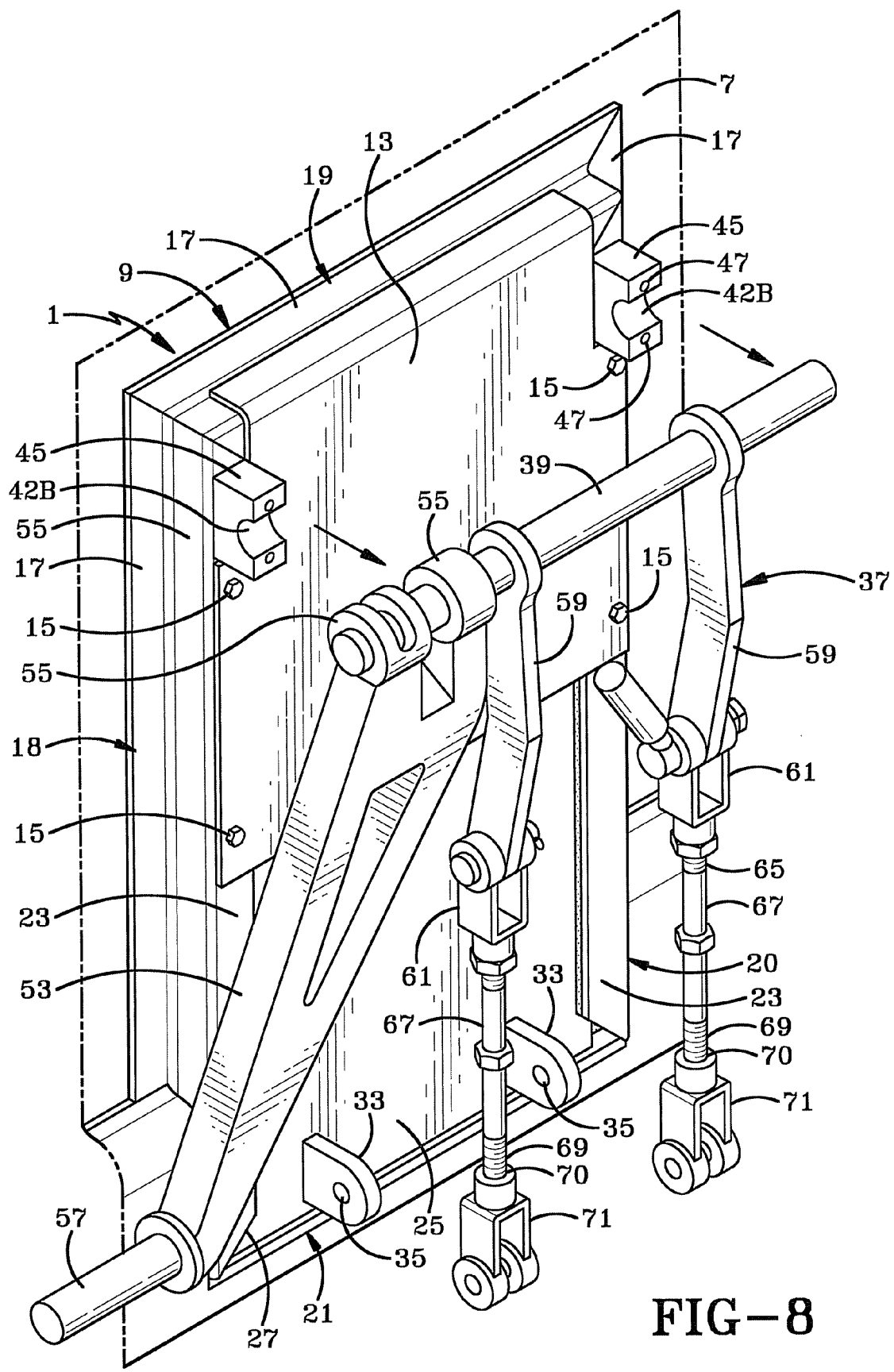
FIG. 8 is a perspective view with the linkage assembly removed from the frame and chute door.

The method for removing pivot linkage assembly 37 from center door assembly 1 is shown in FIGS. 7 and 8. First, threaded bolts 49 are removed from threaded receiving hole 47 and hole 51 within pillow block bearings 41. This allows first block 43 to be separated and removed from second block 45, releasing axle 39. Second, cotter pins 75 are removed from bolts 73. Bolts 73 are then free to be removed from second U-shaped brackets 71 and lobes 33, releasing second U-shaped brackets 71 from center door assembly 1. As shown in FIG. 8, pivot linkage assembly 37 may then be removed from center door assembly 1. As shown in FIG. 9, pivot linkage assembly 37 is a sub-assembly which is easily removed as a unit from center door assembly 1. This exposes the area behind assembly 37 and further facilitates removal of the elements comprising center door assembly 1.

Figure 17:
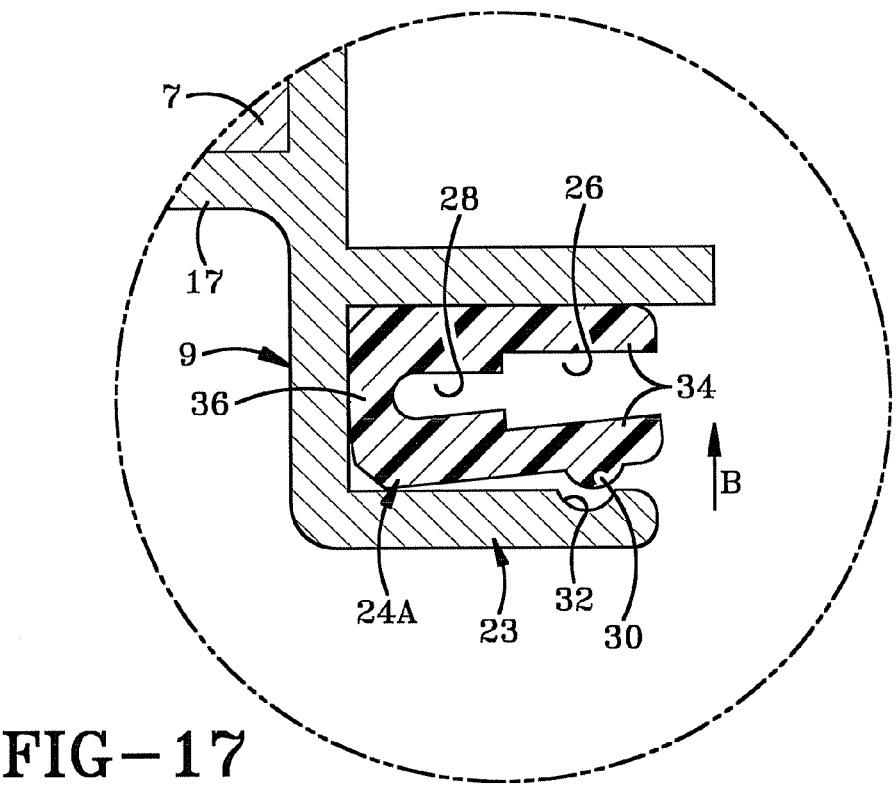
FIG. 17 is a view similar to FIG. 16 with the insert being deformed.
Figure 18:
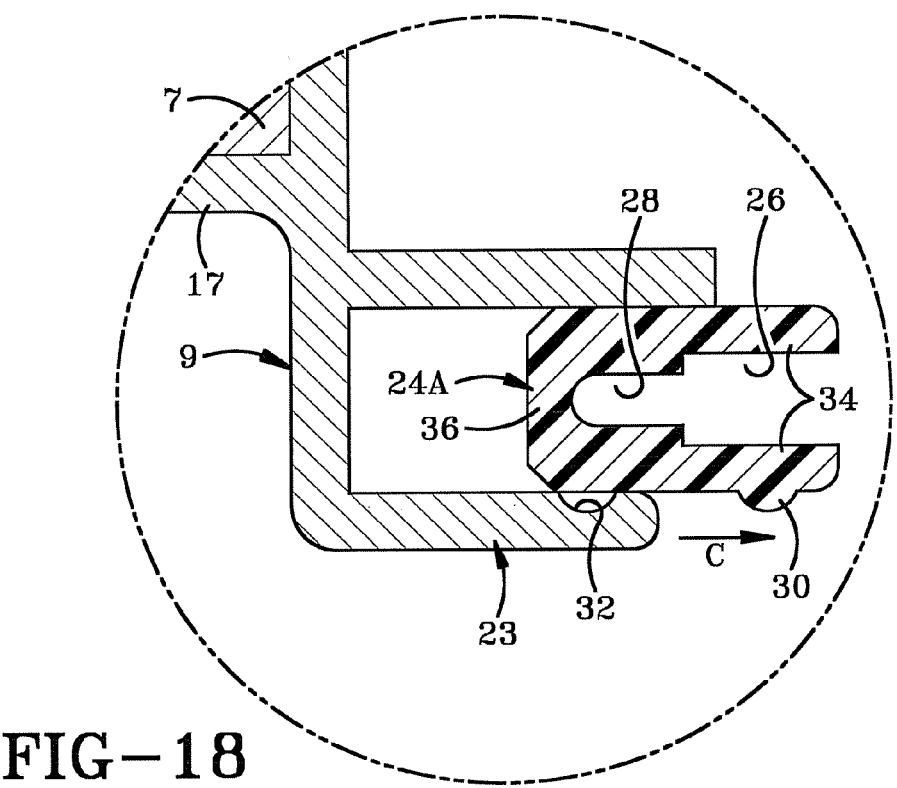
FIG. 18 is a view similar to FIG. 17 with the insert being partially removed from the channel.
Figure 19:
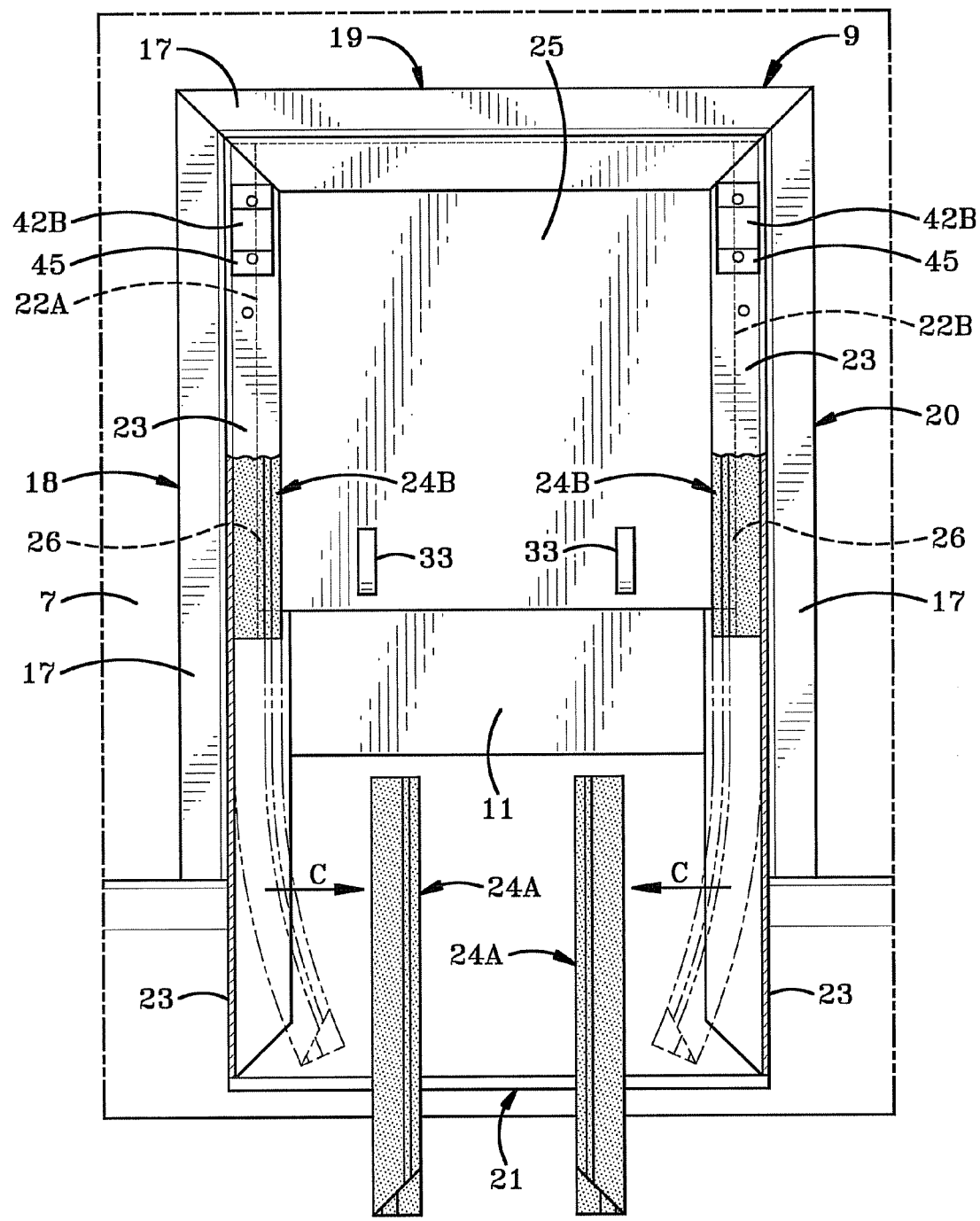
FIG. 19 is a front elevational view similar to FIGS. 12 and 15 with parts cut away and the door in the open position and the lower inserts shown in phantom being removed.

As shown in FIG. 10, center door assembly 1 is further disassembled by removing bolts 15 which releases outer cover plate 13. Bolts 15 are common hex-head type screws which fit typical wrenches. With outer cover plate 13 removed, door 25 is exposed (FIGS. 11 and 12). As shown in FIG. 15, door 25 is manually lifted in the direction of arrow "A" to move center door assembly 1 into the open position. This exposes inserts 24A at lower notch 27 in U-shaped channels near bottom end 21 of frame 9. The exposing of inserts 24A allow a user to manually grasp insert 24 at notch 27. As shown in FIGS. 17 and 18, the user manually distorts legs 34 of insert 24 in the direction of arrow "B". This bending is facilitated by bend recess 28 formed in end wall 36 of insert 24, which reduces the bend strength of insert 24 by providing a ready crease in the material. As legs 34 of insert 24 are bent inwardly, D-shaped nub 30 is released from D-shaped recess, allowing insert 24 to slide out of U-shaped channel 23 in the direction of arrow "C" at bottom end 21 of frame 9. As shown in FIG. 19, inserts 24A are manually pulled out of U-shaped channels 23 proximate bottom end 21 of frame 9 in the direction of arrow "C". Inserts 24A are fully extracted and may be replaced if worn or damaged.

Figure 20:
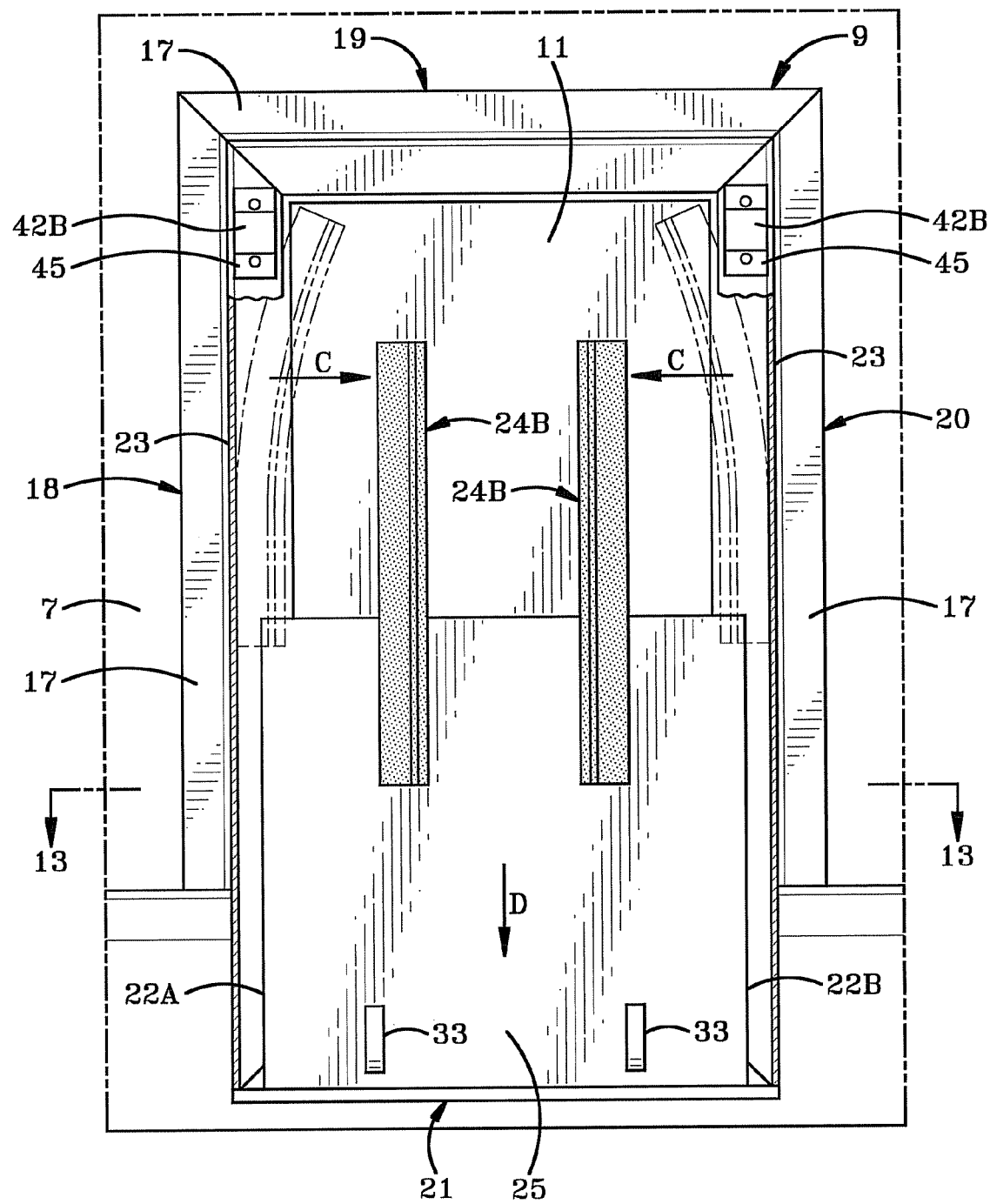
FIG. 20 is a view similar to FIG. 19 with the door in the closed position and the upper inserts shown in phantom being removed.

As shown in FIG. 20, door 25 is then manually lowered to the closed position by moving door 25 in the direction of arrow "D". The process of removing inserts 24A is then repeated for inserts 24B. Door 25 is now less restrained within U-shaped channels 23 because the space occupied by inserts 24 is empty. As shown in FIG. 21, to remove door 25, it is manually moved in the direction of arrow "E". This exposes sidewall 22B as it retracts from U-shaped channel 23. As shown in FIG. 22, sidewall 22B is free to move in the direction of arrow "F", releasing the entire door 25 from center door assembly 1.

Door 25 and inserts 24 may then be replaced or fixed to restore center door assembly 1 to workable condition. To install the elements of center door assembly 1, the removal process is simply reversed. Elements are added and secured by the same process, allowing the user to quickly and easily fix the elements within assembly 1. The truck owner may replace elements such as door 25 with common tools and without breaking welds or welding parts back into place. This dramatically eases the replacement of parts within assembly 1.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A center door assembly for a dump bed comprising:
   a frame adapted to be mounted in a wall of a dump bed, said frame having a pair of opposite and spaced apart channels;
   at least one insert removably mounted in one of said channels;
   a retractable door having a pair of edges slidably received in the at least one insert and movable linearly within the channels between a closed position and an open position;
   a pivot linkage assembly operatively connected to the door for linearly moving said door between the closed and open positions; and
   wherein the at least one insert when removed from the channel enables the door to be removed from the frame.

2. The center door assembly of claim 1, wherein the linkage assembly includes at least one pillow block bearing secured to the frame, and wherein a first end of the pivot linkage assembly is removably secured to the frame by the at least one pillow block bearing.

3. The center door assembly of claim 2, wherein a second end of the pivot linkage assembly is removably secured to the door.

4. The center door assembly of claim 1, further comprising an outer cover plate removably secured to the frame and covering a portion of the door when the door is in the open position.

5. The center door assembly of claim 1, further comprising a notch formed in the said one channel exposing a portion of the at least one insert when the door is in the open position for grasping and removing the insert from within said one channel.

6. The center door assembly of claim 5, further comprising a bend recess formed in the at least one insert, wherein said bend recess allows the insert to be compressed to facilitate its removal from the said one channel.

7. The center door assembly of claim 6, wherein the at least one insert is U-shaped having a pair of legs extending from an end wall, and wherein the bend recess is formed in the end wall.

8. The center door assembly of claim 7, wherein the at least one insert is comprised of an elastomeric material.

9. The center door assembly of claim 1, further comprising the said one insert and a second insert removably mounted in each of said channels in a spaced parallel relationship to slidably receive the longitudinal edges of the retractable door therein; and wherein said inserts are formed of an elastomeric material.

10. The center door assembly of claim 9, wherein the inserts are each generally U-shaped having a pair of legs extending from an end wall, and wherein the longitudinal edges of the retractable door are slidably received within one of each pair of legs and the respective end wall.

* * * * *